(12) United States Patent
Suzuki et al.

(10) Patent No.: US 8,210,726 B2
(45) Date of Patent: Jul. 3, 2012

(54) DOOR MIRROR FOR AN AUTOMOBILE

(75) Inventors: Kentaro Suzuki, Fujieda (JP); Yosuke Sato, Fujieda (JP)

(73) Assignee: Murakami Corporation, Shizuoka (JP)

( * ) Notice: Subject to any disclaimer, the term of this patent is extended or adjusted under 35 U.S.C. 154(b) by 0 days.

(21) Appl. No.: 12/938,631

(22) Filed: Nov. 3, 2010

(65) Prior Publication Data
US 2011/0205747 A1    Aug. 25, 2011

(30) Foreign Application Priority Data
Feb. 25, 2010   (JP) .................................. 2010-040878

(51) Int. Cl.
*B60Q 1/00*    (2006.01)
(52) U.S. Cl. ........ 362/494; 362/501; 362/492; 362/135; 362/544
(58) Field of Classification Search .................. 362/501, 362/492, 494, 135, 140, 141, 540, 541, 544–547, 362/516–518, 464, 142, 234, 241, 251, 503, 362/506, 459; 359/841, 843, 874, 838, 876, 359/877, 881, 871; 248/480, 487; 340/468; 296/1.11
See application file for complete search history.

(56) References Cited

U.S. PATENT DOCUMENTS

| | | | | |
|---|---|---|---|---|
| 4,812,955 A | * | 3/1989 | Beswick et al. | 362/240 |
| 6,039,448 A | * | 3/2000 | Oprea | 359/850 |
| 6,142,656 A | * | 11/2000 | Kurth | 362/494 |
| 6,250,783 B1 | * | 6/2001 | Stidham et al. | 362/494 |
| 6,511,192 B1 | * | 1/2003 | Henion et al. | 359/864 |
| 6,811,288 B2 | * | 11/2004 | Hutzel | 362/494 |
| 7,008,089 B1 | * | 3/2006 | McCloy et al. | 362/494 |
| 2005/0225994 A1 | * | 10/2005 | Rodriguez Barros et al. | 362/494 |
| 2010/0296185 A1 | | 11/2010 | Itoh et al. | |

FOREIGN PATENT DOCUMENTS

JP    2002-96684 A    4/2002

OTHER PUBLICATIONS

U.S. Appl. No. 12/938,612 to Suzuki et al, Nov. 3, 2010.

* cited by examiner

*Primary Examiner* — Anabel Ton
*Assistant Examiner* — Danielle Allen
(74) *Attorney, Agent, or Firm* — Greenblum & Bernstein P.L.C.

(57) ABSTRACT

The present invention provides a door mirror for an automobile, in which molding errors are made difficult to occur in a housing and assembling accuracy between the housing and a lamp assy is improved. A housing applied to the door mirror for an automobile is divided into two parts, that is, an upper housing located on the upper side and a lower housing located on the lower side, and a lamp assy constituting a side-turn lamp is disposed between the upper housing and the lower housing. Since the housing is divided vertically into two parts, materials or colors of the upper housing and the lower housing can be made different so that a texture and an appearance of the housing can be easily changed. Moreover, assembling errors between the housing and the lamp assy due to deformation by injection molding or thermal deformation applied during painting can hardly occur, and a gap can be hardly generated between the housing and the lamp assy on the surface side of the housing.

5 Claims, 8 Drawing Sheets

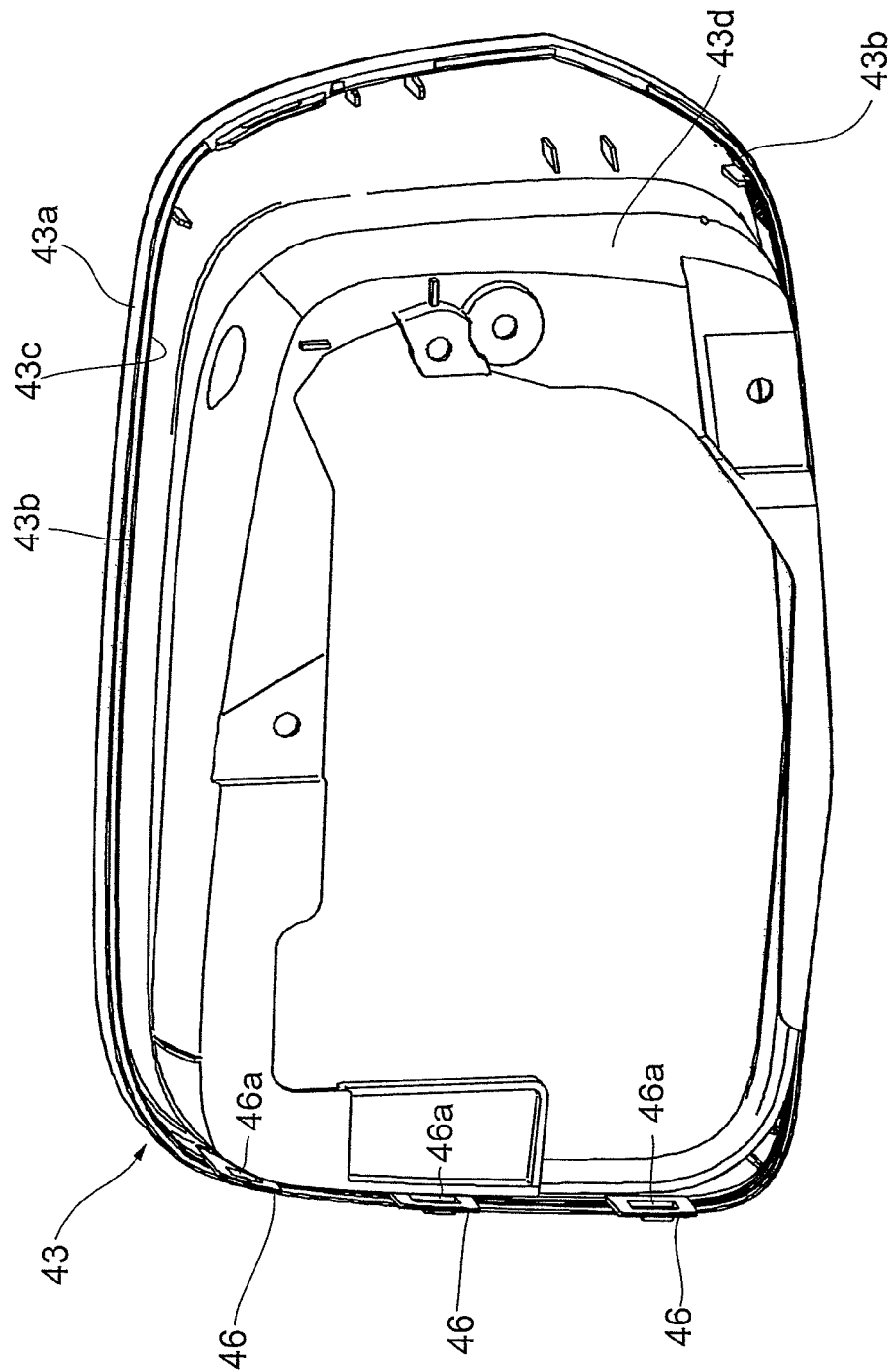

DOOR MIRROR FOR AN AUTOMOBILE

CROSS-REFERENCE TO RELATED APPLICATION

The disclosure of Japanese Patent Application No. JP2010-040878 filed on Feb. 25, 2010 including the specification, drawings and abstract is incorporated herein by reference in its entirety.

BACKGROUND OF THE INVENTION

1. Field of the Invention

The present invention particularly relates to a door mirror for an automobile provided with a lamp assy (i.e., a lamp assembly, e.g., a side-turn lamp).

2. Related Background of the Invention

Prior-art technologies of this field include Japanese Patent Laid-Open No. 2002-96684. A door mirror described in this Gazette is provided with a housing made of resin in the shape of a curved container whose rear side is opened. In this housing, a laterally long U-shaped notch portion extending inward from an outer end in the car width direction is formed. Into this notch portion, a laterally long side-turn lamp is inserted. A lens is fixed to a lens base of this side-turn lamp by welding or the like, and in an internal space formed by the lens base and the lens, LEDs are aligned. This side-turn lamp is fixed to the inside of the housing by a screw.

SUMMARY OF THE INVENTION

In the prior-art door mirror described above, the side-turn lamp inserted into the notch portion of the housing is fixed by the screw so as to be flush with the surface of the housing, and an edge portion forming the notch portion of the housing and an edge portion of the side-turn lamp are constructed to be butted to each other. However, since the laterally long U-shaped notch portion is formed in the housing, assembling errors can easily occur between the housing and the side-turn lamp due to distortion by injection molding and thermal deformation applied during painting, and there has been a problem that a gap can be easily generated between the housing and the side-turn lamp on the surface side of the housing. In such housing, dimensional tuning is likely to be required.

The present invention has an object to provide a door mirror for an automobile in which molding errors hardly occurs in a housing and assembling accuracy between the housing and a lamp assy is improved.

The present invention is, in a door mirror for an automobile having a cup-shaped housing, constructed such that a housing is divided into two parts, that is, an upper housing made of resin located on the upper side and a lower housing made of resin located on the lower side, and a lamp assy is disposed between the upper housing and the lower housing.

In this door mirror for an automobile, since the housing is divided into two parts, that is, the upper housing located on the upper side and the lower housing located on the lower side, materials or colors of the upper housing and the lower housing can be made different so that a texture and an appearance of the housing can be easily changed. Moreover, since there is no need to form a laterally long U-shaped notch portion into which the lamp assy is to be inserted in the housing as before, assembling errors between the housing and the lamp assy due to deformation by injection molding or thermal deformation applied during painting can hardly occur, and a gap can be hardly generated between the housing and the lamp assy on the surface side of the housing. Such housing hardly requires dimensional tuning.

Also, it is preferable that the housing has a lamp exposed portion that separates a first divided end face formed at a lower end of the upper housing and a second divided end face formed at an upper end of the lower housing from each other so as to expose the lamp assy and a joint portion that joins the first divided end face of the upper housing and the second divided end face of the lower housing together.

Since the housing of such configuration has a portion that directly joins the upper housing and the lower housing together, rigidity of the housing itself can be improved.

Also, it is preferable that there are provided in the joint portion, a first locking piece located on an inner face of the upper housing, protruding downward across the first divided end face of the upper housing and hooked by an inner face of the lower housing and a second locking piece located on the inner face of the upper housing, protruding upward across the second divided end face of the lower housing and hooked by the inner face of the upper housing are disposed.

By employing such configuration, the upper housing and the lower housing can be joined through one-touch operation, whereby assembling workability is improved.

Also, it is preferable that on the inner face of the upper housing, a guide rib is installed upright which is inclined so as to approach the second locking piece as it goes upward, at a position where a distal end of the second locking piece is brought into contact when the second locking piece is inserted.

Since the upper housing and the lower housing can be joined while the second locking piece used for joining the upper housing and the lower housing together is pressed onto the guide rib, the upper housing and the lower housing can be easily joined without displacement of the lower housing with respect to the upper housing in the extending direction of the divided end face. Moreover, since the guide rib is inclined, even if the insertion position of the second locking piece is somewhat displaced in the extending direction of the divided end face, the second locking piece can be reliably pressed onto the guide rib.

Also, it is preferable that a visor attached to the opening side of the housing is further provided, and in the upper housing and the lower housing, guide pieces located on the inner faces of the upper housing and the lower housing and protruding across the opening-side end face are provided, and the guide pieces are brought into sliding contact with an inner face of the visor.

By employing such configuration, when the visor is to be assembled to the housing, the visor is prevented from being brought into a positional relationship of twist with respect to the housing, and the visor can be reliably assembled to the housing along the guide pieces, thus improving assembling workability.

According to the present invention, molding errors of the housing hardly occurs, and the assembling accuracy between the housing and the lamp assy can be improved.

BRIEF DESCRIPTION OF THE DRAWINGS

FIG. 8 is a perspective view illustrating the back side of the visor.

DESCRIPTION OF THE PREFERRED EMBODIMENTS

A preferred embodiment of a housing structure of a door mirror according to the present invention will be described in detail referring to the attached drawings.

Figure 1:
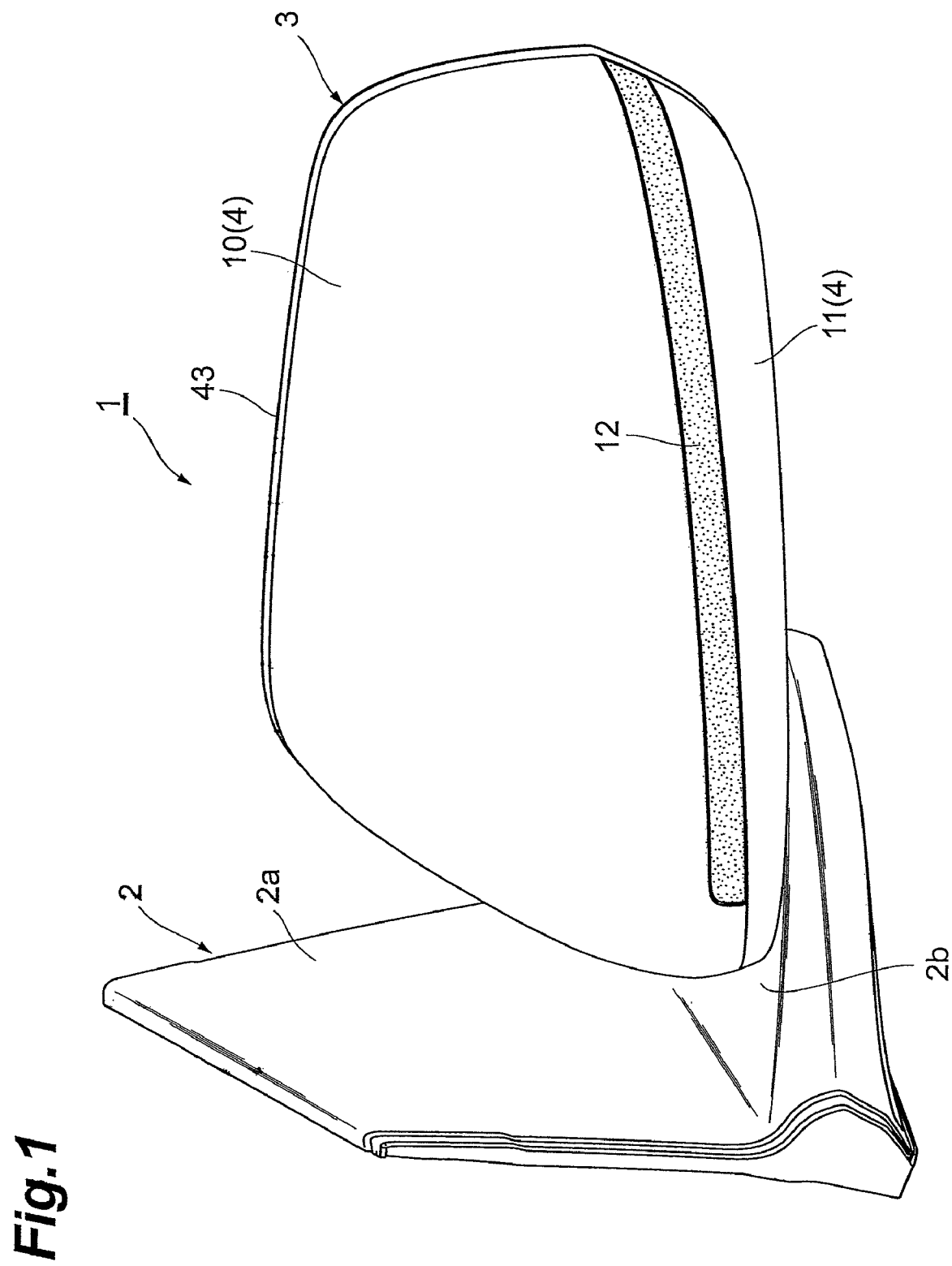
FIG. 1 is a perspective view illustrating an embodiment of a door mirror for an automobile according to the present invention.

As shown in FIG. 1, a door mirror 1 for an automobile includes a door-mirror base 2 made of resin and having a pedestal portion 2b extending horizontally from a base portion 2a bolted to a front door and a door-mirror main body 3 mounted to the pedestal portion 2b of the door-mirror base 2. This door-mirror main body 3 includes a shaft whose lower end is fixed to the pedestal portion 2b of the door-mirror base 2 by a screw, a frame made of resin that fixes a tilting mechanism of a mirror and the like and is rotatable with respect to the shaft, a cup-shaped housing 4 made of resin to which the frame is fixed, and a visor 43 made of resin and fitted to the housing 4 around an opening of the housing 4 so as to surround the mirror.

Figure 2:
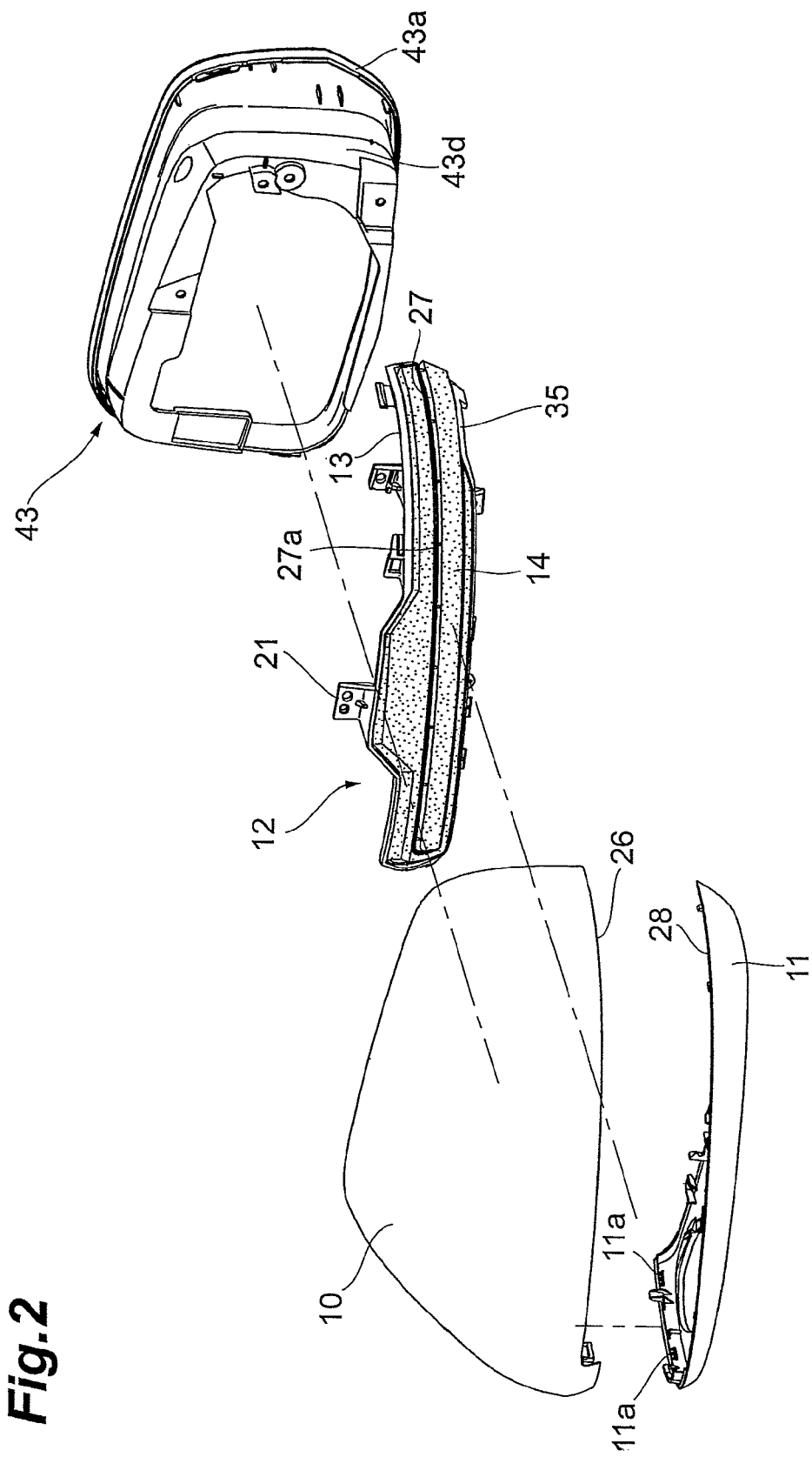
FIG. 2 is an exploded perspective view illustrating a housing, a lamp assy, and a visor.
Figure 3:
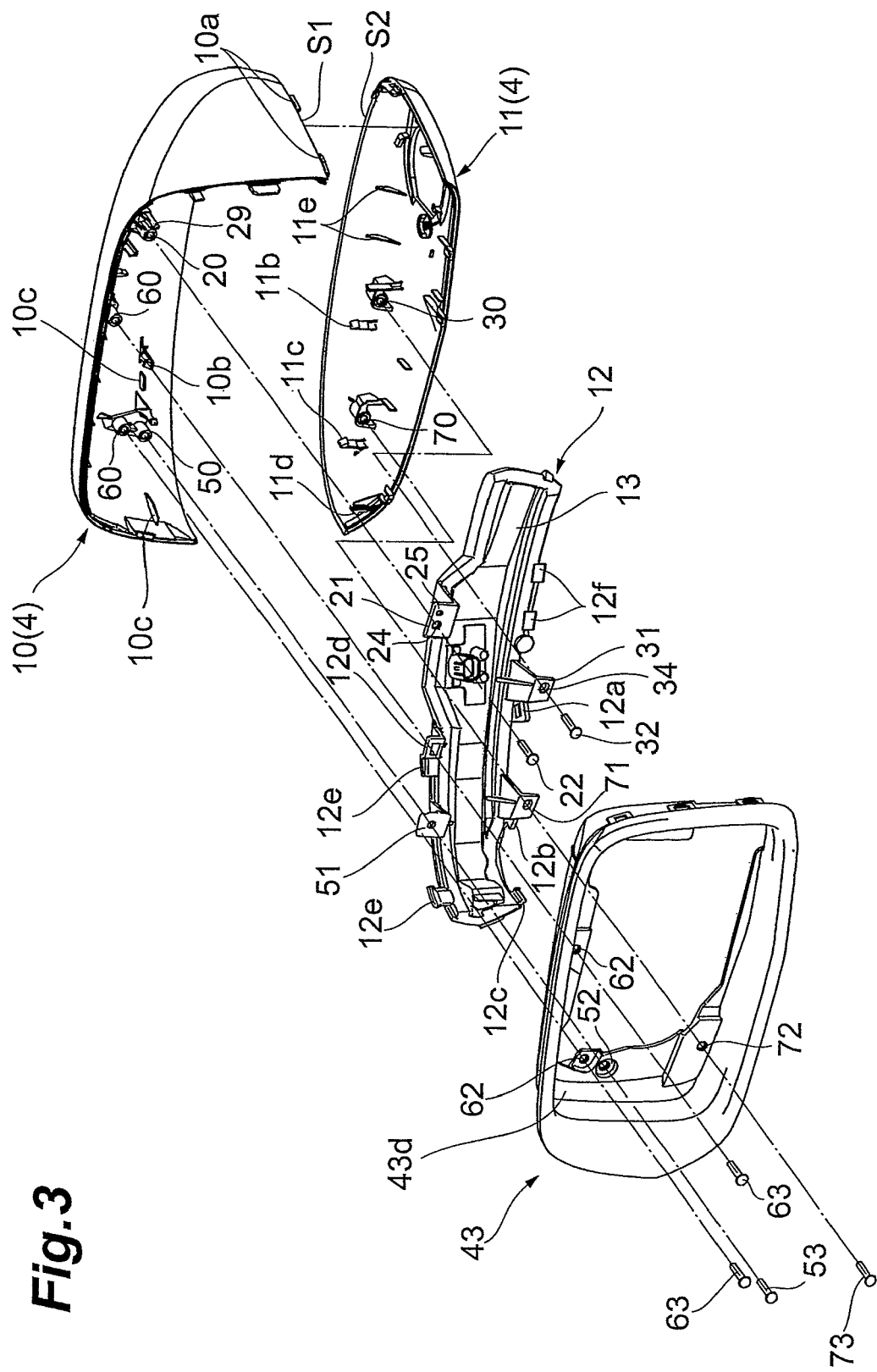
FIG. 3 is an exploded perspective view illustrating the housing, the lamp assy, and the visor.

As shown in FIGS. 2 and 3, the housing 4 is divided into two parts, that is, an upper housing 10 located on the upper side and a lower housing 11 located on the lower side, and a lamp assy 12 constituting a side-turn lamp is disposed between the upper housing 10 and the lower housing 11.

Since the housing 4 is divided vertically into two parts as above, materials or colors of the upper housing 10 and the lower housing 11 can be made different, and a texture or an appearance of the housing 4 can be easily changed. Moreover, since there is no need to form a laterally long U-shaped notch portion into which the lamp assy is to be inserted in the housing 4 as before, assembling errors between the housing 4 and the lamp assy 12 due to deformation by injection molding or thermal deformation applied during painting can hardly occur, and a gap can be hardly generated between the housing 4 and the lamp assy 12 on the surface side of the housing 4. Such housing 4 hardly requires dimensional tuning.

Also, the lamp assy 12 has a lens base 13 fixed to the upper housing 10 and the lower housing 11, a lens portion 14 fixed to this lens base 13 by welding or the like, and LEDs (not shown) aligned in an internal space formed by the lens base 13 and the lens portion 14.

Moreover, on the inner face of the lower housing 11, claw pieces 11b, 11c, and 11d protruding in the vertical direction are provided, and on the lower side of the lamp assy 12, locking pieces 12a, 12b, and 12c protruding in the horizontal direction are provided. When distal end portions of the respective claw pieces 11b, 11c, and 11d are hooked by the locking pieces 12a, 12b, and 12c, the lamp assy 12 is locked by the lower housing 11, and separation between the lamp assy 12 and the lower housing 11 in the vertical direction is prevented.

On the inner face of the lower housing 11, a triangular rib 11e is installed upright, while on the lower side of the lamp assy 12, a receiving face 12f extending in the vertical direction is formed, and when the receiving face 12f is brought into contact with the upright face of the rib 11e, the lamp assy 12 is pressed onto the lower housing 11 in the horizontal direction.

Also, on the inner face of the upper housing 10, a claw piece 10b protruding in the horizontal direction is provided, while on the upper side of the lamp assy 12, a locking piece 12d protruding in the vertical direction is provided. By hooking the distal end portion of the claw piece 10b by the locking piece 12d, the lamp assy 12 is locked by the upper housing 10, and removal of the lamp assy 12 from the upper housing 10 in the horizontal direction is prevented.

Moreover, an L-shaped pressing claw 12e protruding in the vertical direction is provided on the upper side of the lamp assy 12, while a hooking rib 10c protruding in the horizontal direction is provided on the inner face of the upper housing 10. Then, by hooking the distal end portion of the pressing claw 12e by the hooking rib 10c, separation between the lamp assy 12 and the upper housing 10 in the vertical direction is prevented.

Also, a boss portion 20 protruding in the horizontal direction is provided on the inner face of the upper housing 10, and a contact piece 21 extending in the vertical direction and brought into contact with a free end of the boss portion 20 is provided on the upper side of the lens base 13 of the lamp assy 12. Moreover, at the center of this boss portion 20, a screwing portion into which a screw 22 is screwed in the horizontal direction is provided, and a screw through hole 24 through which the screw 22 penetrates is foamed in the contact piece 21.

In the upper housing 10, a positioning pin 29 protruding in the horizontal direction is provided adjacently to the boss portion 20, and this positioning pin 29 achieves positioning of the lamp assy 12 with respect to the upper housing 10 by being inserted into a pin insertion hole 25 formed in the contact piece 21. Moreover, on the surface side of the upper housing 10, a first butting portion 26 extending in the horizontal direction and to be butted to the lens portion 14 of the lamp assy 12 is formed. This first butting portion 26 is brought into contact with a step-like second butting portion 27 located on the surface side of the lamp assy 12 and extending in the horizontal direction, and on this second butting portion 27, projection portions 27a are integrally formed at an equal interval.

Similarly, a boss portion 30 protruding in the horizontal direction is provided on the inner face of the lower housing 11, while on the lower side of the lens base 13 of the lamp assy 12, a contact piece 31 extending in the vertical direction and to be brought into contact with a free end of the boss portion 30 is provided. Moreover, at the center of this boss portion 30, a screwing portion into which a screw 32 is screwed in the horizontal direction is provided, while in the contact piece 31, a screw through hole 34 through which the screw 32 penetrates is formed. Moreover, on the surface side of the lower housing 11, a first butting portion 28 extending in the horizontal direction and to be butted to the lens portion 14 of the lamp assy 12 is formed. This first butting portion 28 is brought into contact with a step-like second butting portion 35 located on the surface side of the lamp assy 12 and extending in the horizontal direction. In this second butting portion 35, too, projection portions (not shown) similar to the projection portions 27a are integrally molded.

The housing 4 will be described in more detail.

Figure 4:
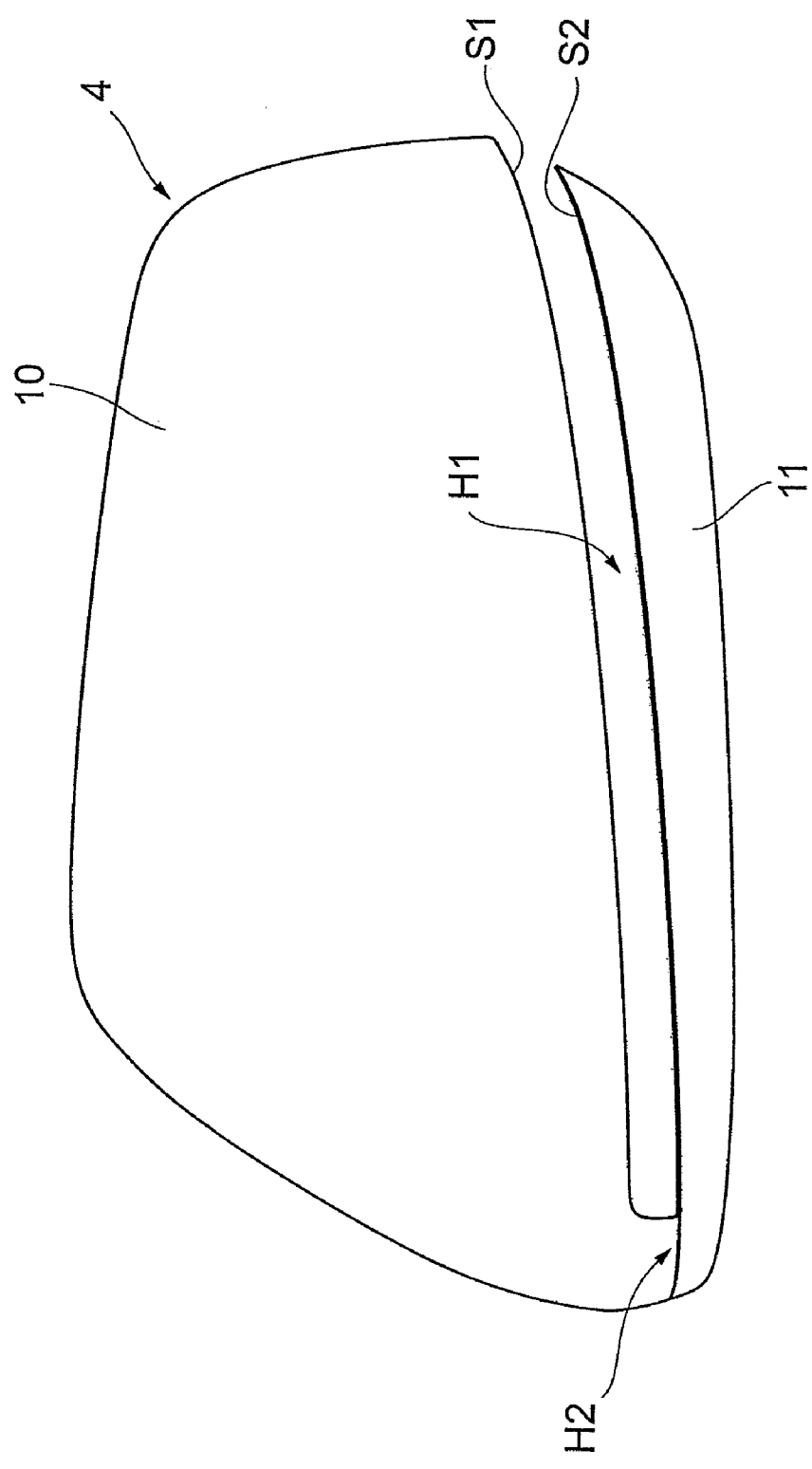
FIG. 4 is a perspective view illustrating the housing.

As shown in FIG. 4, a first divided end face S1 extending substantially in the horizontal direction is formed at a lower end of the upper housing 10, while a second divided end face S2 extending substantially in the horizontal direction is formed at an upper end of the lower housing 11. The housing 4 has a lamp exposed portion H1 that separates the first divided end face S1 of the upper housing 10 and the second divided end face S2 of the lower housing 11 from each other so as to expose the lamp assy 12 and a joint portion H2 that joins the first divided end face S1 of the upper housing 10 and the second divided end face S2 of the lower housing 11.

Figure 5:
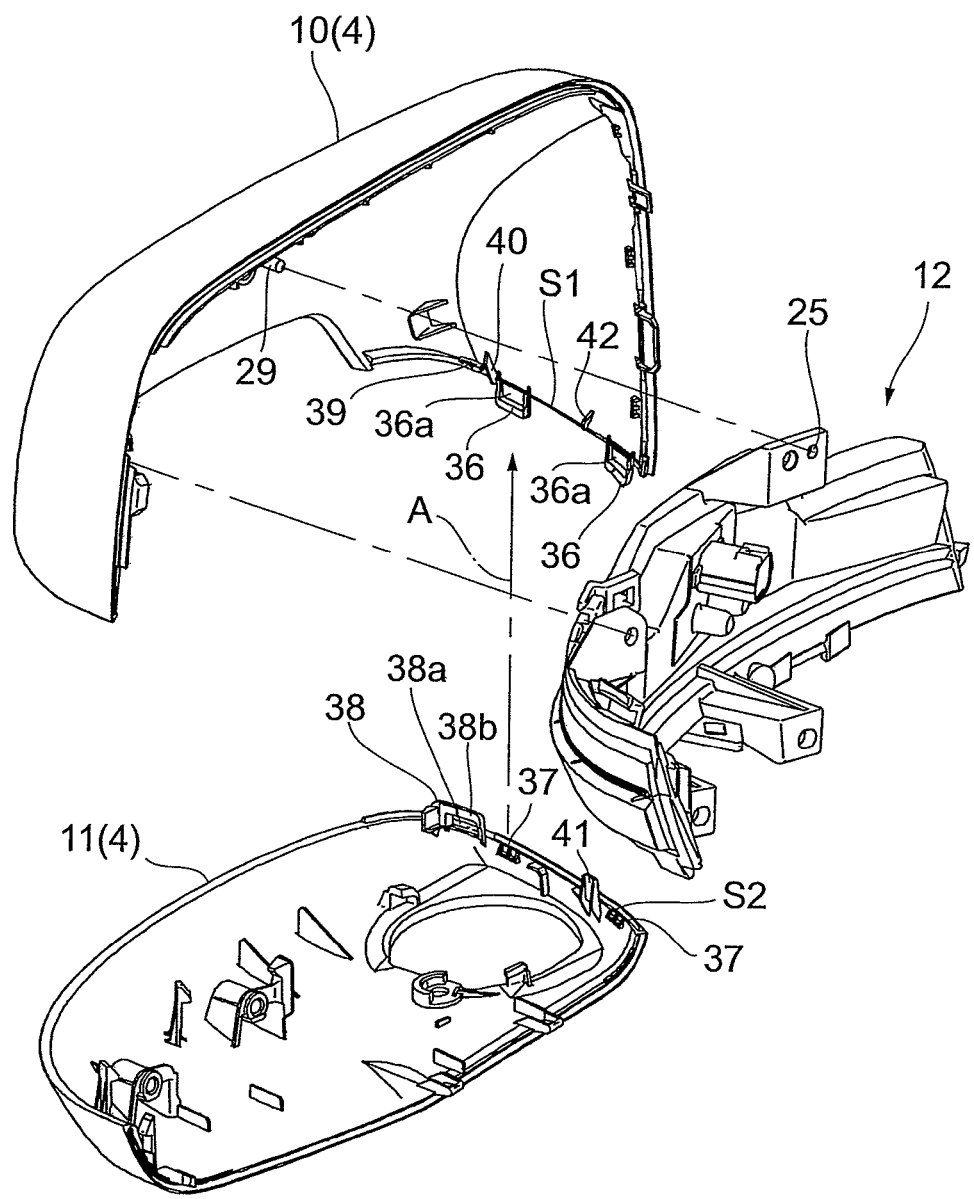
FIG. 5 is a perspective view illustrating the housing and the lamp assy.
Figure 6:
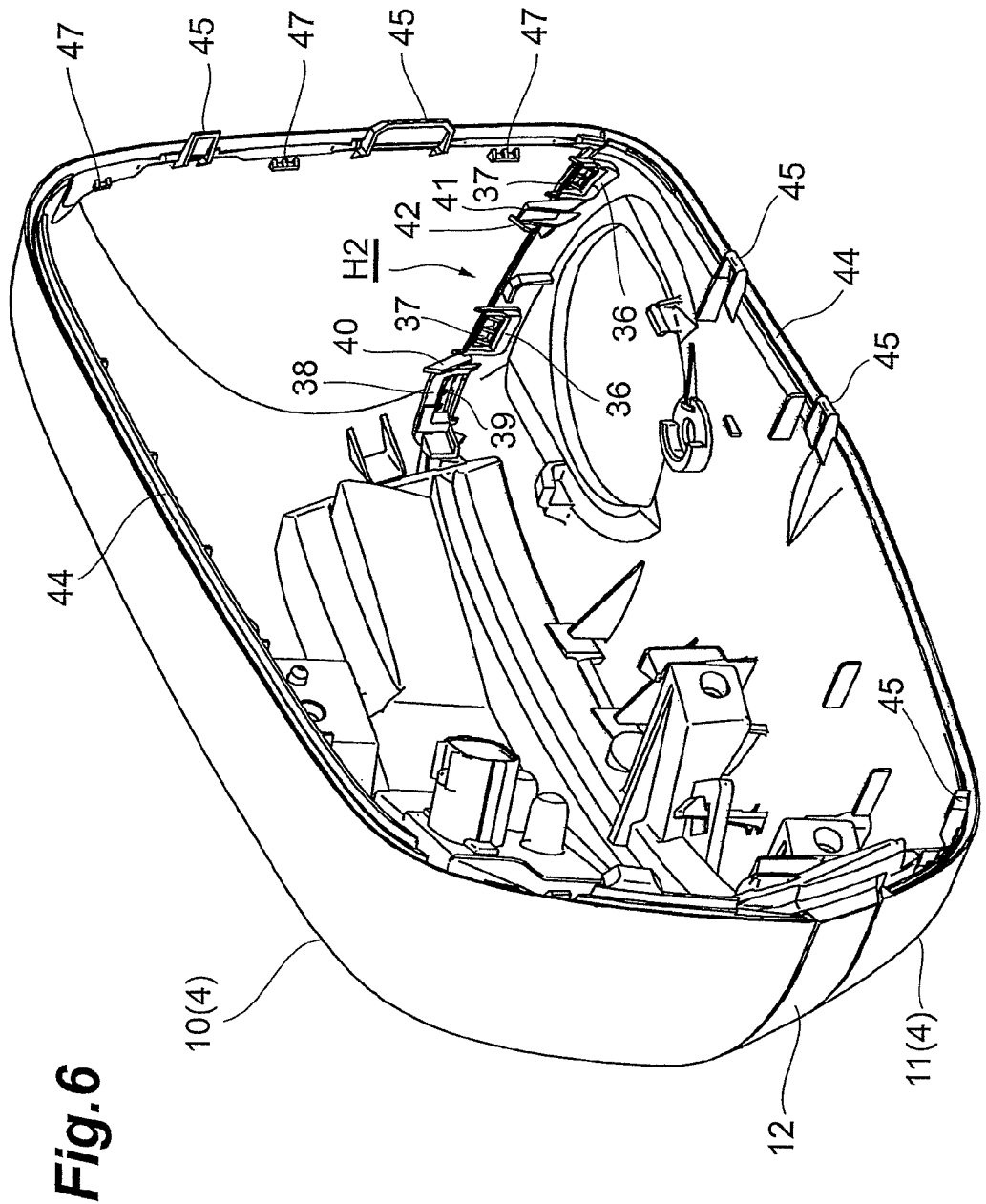
FIG. 6 is a perspective view illustrating a state in which the lamp assy is assembled to the housing.
Figure 7:
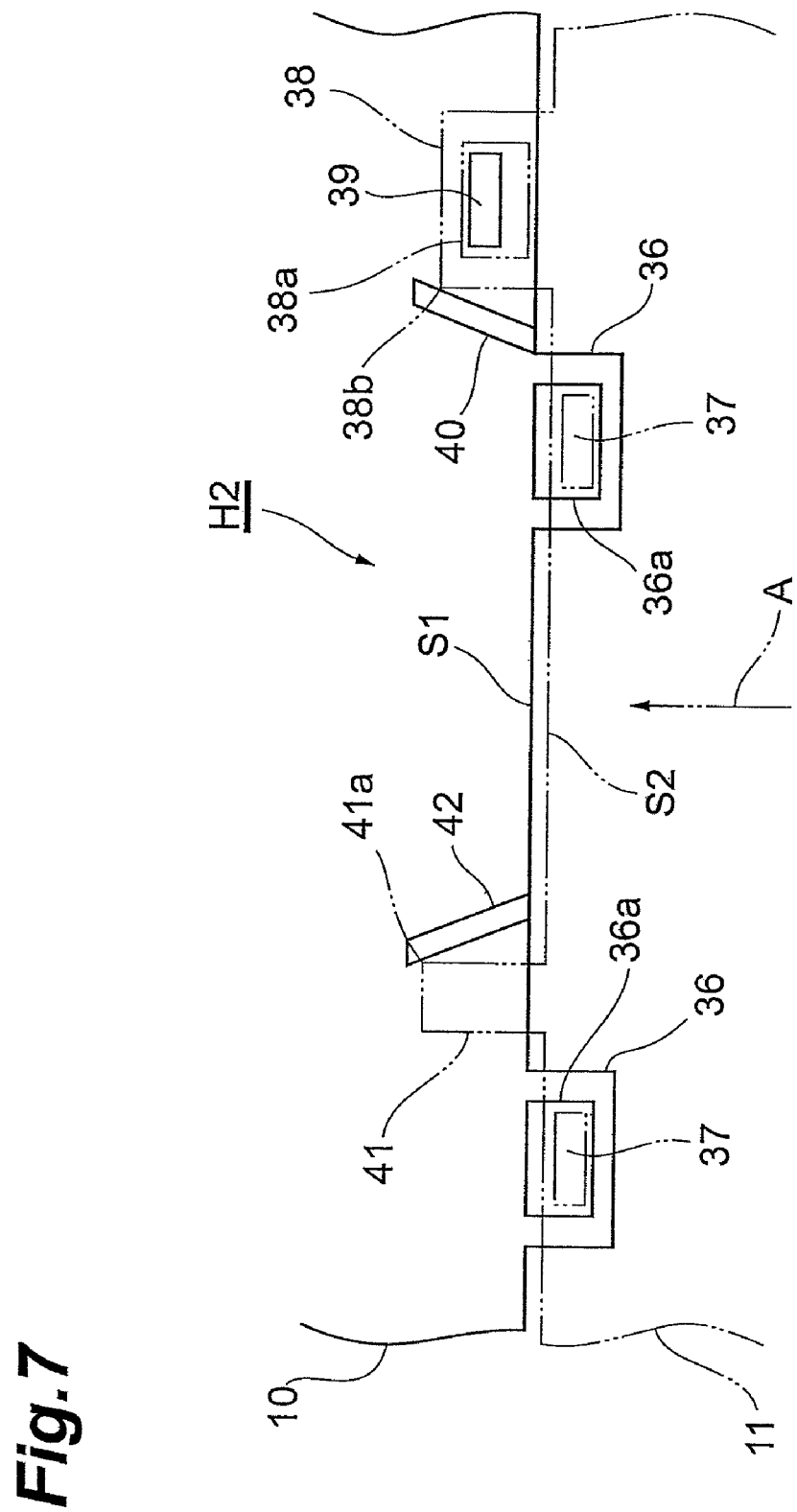
FIG. 7 is a side view illustrating a connected state between an upper housing and a lower housing at a joint portion.

As shown in FIGS. 5 to 7, there are provided in the joint portion H2, a first locking piece 36 located on the inner face of the upper housing 10, protruding downward across the first divided end face S1 of the upper housing 10 and hooked by the inner face of the lower housing 11 and a second locking piece 38 located on the inner face of the lower housing 11, protruding upward across the second divided end face S2 of the lower housing 11 and hooked by the inner face of the upper housing 10.

Each of the first locking pieces 36 is provided side by side with each other along the first divided end face S1 and is formed in the U-shape having a rectangular hollow portion 36a. On the other hand, on the inner face of the lower housing 11, a claw portion 37 that can be hooked by the hollow portion 36a of the first locking piece 36 is formed, and since the claw portion 37 has a substantially right-triangular section with the upper part as the apex, the hollow portion 36a of the first locking piece 36 can be easily hooked by the claw portion 37, and once the first locking piece 36 is locked by the claw portion 37, the first locking piece 36 is hardly removed.

Similarly, the second locking piece 38 has the U-shape having a rectangular hollow portion 38a. On the other hand, on the inner face of the upper housing 10, a claw portion 39 that can be hooked by the hollow portion 38a of the second locking piece 38 is formed, and since this claw portion 39 has a substantially right-triangular section with the lower part as the apex, the hollow portion 38a of the second locking piece 38 can be easily hooked by the claw portion 39, and once the second locking piece 38 is locked by the claw portion 39, the second locking piece 38 is hardly removed.

As mentioned above, since the housing 4 has the portion H2 for directly joining the upper housing 10 and the lower housing 11 to each other, rigidity of the housing 4 itself can be improved. Further, the upper housing 10 and the lower housing 11 can be joined through one-touch operation, and thus assembling workability is improved.

On the inner face of the upper housing 10, a guide rib 40 inclined so as to approach the second locking piece 38 as going upward is set upright at a position where a corner portion 38b at the distal end of the second locking piece 38 is brought into contact when the second locking piece 38 of the lower housing 11 is inserted from below toward the first divided end face S1 of the upper housing 10 in an arrow A direction.

Moreover, on the inner face of the lower housing 11, a positioning piece 41 protruding upward across the second divided end face S2 of the lower housing 11 is formed. On the inner face of the upper housing 10, a guide rib 42 inclined so as to approach the positioning piece 41 as going upward is set upright at a position where a corner portion 41a at the distal end of the positioning piece 41 is brought into contact when the positioning piece 41 of the lower housing 11 is inserted from below toward the first divided end face S1 of the upper housing 10 in an arrow A direction.

As shown in FIG. 7, since the upper housing 10 and the lower housing 11 can be joined together while the second locking piece 38 used for joining of the upper housing 10 and the lower housing 11 and the positioning piece 41 used only for positioning are butted to the respective guide ribs 40 and 42, the upper housing 10 and the lower housing 11 can be easily joined together without displacement of the lower housing 11 with respect to the upper housing 10 in the extending directions of the divided end faces S1 and S2. Moreover, since the guide ribs 40 and 42 are inclined, even if the insertion positions of the second locking piece 38 and the positioning piece 41 are somewhat displaced in the extending directions of the divided end faces S1 and S2, either one or both of the second locking piece 38 and the positioning piece 41 can be reliably pressed onto the guide ribs 40 and 42.

As shown in FIGS. 3, 6, and 8, the visor 43 is attached to the opening side of the housing 4, a skirt-shaped peripheral edge 43a is formed on the outer periphery of the visor 43, and a mirror container portion 43d located inside the peripheral edge 43a is provided on the visor 43 so that an inclinable mirror is contained within the mirror container portion 43d. At the free end of the peripheral edge 43a, projection portions 43b extending substantially in the horizontal direction are formed on the upper side and the lower side, and the projection portion 43b is inserted into a recess portion 44 extending along the end face on the opening side of the housing 4, and thereby the housing 4 and the visor 43 are positioned.

In the upper housing 10 and the lower housing 11, tapered guide pieces 45 located on the inner face of the upper housing 10 and the lower housing 11 and protruding across the end faces on the opening side are provided. When the visor 43 is attached to the opening side of the housing 4, each guide piece 45 is brought into sliding contact with an inner face 43c of the peripheral edge 43a in the visor 43. By employing such configuration, when the visor 43 is assembled to the housing 4, the visor 43 is prevented from being brought into a positional relationship of twist with respect to the housing 4, and the visor 43 can be reliably assembled to the housing 4 along the guide pieces 45, and thus assembling workability is improved.

Moreover, on the peripheral edge 43a of the visor 43, third locking pieces 46 protruding from this free end are provided, and each of the third locking pieces 46 is provided side by side with each other and is formed in the U-shape having a rectangular hollow portion 46a. On the other hand, on the inner face of the upper housing 10, a claw portion 47 that can be hooked by the hollow portion 46a of the third locking piece 46 is formed, and since the claw portion 47 has a substantially right-triangular section with the opening side of the housing 4 as the apex, the hollow portion 46a of the third locking piece 46 can be easily hooked by the claw portion 47, and once the third locking piece 46 is locked by the claw portion 47, the third locking piece 46 is hardly removed.

As shown in FIG. 3, a boss portion 50 is provided on the upper housing 10, while a contact piece 51 to be brought into contact with the free end of the boss portion 50 is provided on the lamp assy 12, and a screw through hole 52 is provided in the visor 43, and the boss portion 50, the contact piece 51, and the visor 43 are connected by a screw 53. On the upper housing 10, a boss portion 60 is provided, while a screw through hole 62 is provided in the visor 43, and the boss portion 60 and the visor 43 are connected by a screw 63. On the lower housing 11, a boss portion 70 is provided, while a contact piece 71 to be brought into contact with the free end of the boss portion 70 is provided on the lamp assy 12, a screw through hole 72 is provided on the visor 43, and the boss portion 70, the contact piece 71, and the visor 43 are connected by a screw 73.

It is needless to say that the present invention is not limited to the above-described embodiment. For example, the guide ribs 40 and 42 may be formed on the lower housing 11 side in order to guide the distal end of the first locking piece 36.

Explanation Of Reference Numerals

1 door mirror
4 housing
10 upper housing
11 lower housing 12 lamp assy
36 first locking piece
38 second locking piece
40 guide rib
43 visor
45 guide piece
S1 first divided end face
S2 second divided end face
H1 lamp exposed portion
H2 joint portion

What is claimed is:

1. A door mirror for an automobile, the door mirror comprising:
   a cup-shaped housing divided into an upper housing made of resin and located on an upper side of the cup-shaped housing and a lower housing made of resin and located on a lower side of the cup-shaped housing;
   a lamp assembly disposed between the upper housing and the lower housing;
   a lamp exposed portion that separates a first divided end face formed at a lower end of the upper housing and a second divided end face formed at an upper end of the lower housing from each other so as to expose the lamp assembly; and
   a joint portion that joins the first divided end face of the upper housing and the second divided end face of the lower housing together.

2. The door mirror for an automobile according to claim 1, wherein there are provided in the joint portion, a first locking piece located on an inner face of the upper housing, protruding downward across the first divided end face of the upper housing and hooked by an inner face of the lower housing; and
   a second locking piece located on the inner face of the upper housing, protruding upward across the second divided end face of the lower housing and hooked by the inner face of the upper housing.

3. The door mirror for an automobile according to claim 2, wherein on the inner face of the upper housing, a guide rib is installed upright which is inclined so as to approach the second locking piece as it goes upward, at a position where a distal end of the second locking piece is brought into contact when the second locking piece is inserted.

4. The door mirror for an automobile according to claim 1, further comprising a visor attached to a side of an opening of the cup-shaped housing, wherein on the upper housing and the lower housing, guide pieces located on the inner faces of the upper housing and the lower housing and protruding across an opening-side end face are provided, and the guide pieces are brought into sliding contact with an inner face of the visor.

5. A door mirror for an automobile, the door mirror comprising:
   a cup-shaped housing divided into an upper housing made of resin located on an upper side of the cup-shaped housing and a lower housing made of resin located on a lower side of the cup-shaped housing;
   a lamp assembly disposed between the upper housing and the lower housing; and
   a visor attached to a side of an opening of the cup-shaped housing, wherein on the upper housing and the lower housing, guide pieces located on the inner faces of the upper housing and the lower housing and protruding across the opening-side end face are provided, and the guide pieces are brought into sliding contact with an inner face of the visor.

* * * * *